US008549441B2

(12) United States Patent
Waldman et al.

(10) Patent No.: US 8,549,441 B2
(45) Date of Patent: Oct. 1, 2013

(54) PRESENTING AND NAVIGATING CONTENT HAVING VARYING PROPERTIES

(75) Inventors: Lawrence Fubini Waldman, Bellevue, WA (US); Neculai Blendea, Redmond, WA (US); Crystal Lynn Hoyer, Seattle, WA (US); Janine Michelle Perret, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 11/763,607

(22) Filed: Jun. 15, 2007

(65) Prior Publication Data

US 2008/0313572 A1  Dec. 18, 2008

(51) Int. Cl.
*G06F 3/048* (2013.01)
*G06F 17/30* (2006.01)
*G06F 3/00* (2006.01)

(52) U.S. Cl.
USPC .................. 715/854; 715/853; 707/E17.02

(58) Field of Classification Search
USPC .................. 715/853, 854; 707/E17.02
See application file for complete search history.

(56) References Cited

U.S. PATENT DOCUMENTS

| | | | |
|---|---|---|---|
| 6,418,430 B1 | 7/2002 | DeFazio et al. | |
| 6,496,843 B1 * | 12/2002 | Getchius et al. | 715/210 |
| 6,996,778 B2 * | 2/2006 | Rajarajan et al. | 715/734 |
| 7,051,019 B1 | 5/2006 | Land et al. | |
| 7,092,966 B2 * | 8/2006 | McIntyre | 1/1 |
| 7,143,362 B2 | 11/2006 | Dieberger et al. | |
| 7,325,201 B2 * | 1/2008 | Ferrari et al. | 715/737 |
| 7,401,097 B1 * | 7/2008 | Baer et al. | 707/999.104 |
| 7,493,303 B2 * | 2/2009 | Newbold et al. | 707/999.002 |
| 7,627,552 B2 * | 12/2009 | Moore et al. | 715/854 |
| 8,010,903 B2 * | 8/2011 | Dieberger et al. | 715/764 |
| 2004/0225640 A1 | 11/2004 | Brown et al. | |
| 2005/0149576 A1 * | 7/2005 | Marmaros et al. | 707/200 |
| 2005/0193015 A1 | 9/2005 | Logston et al. | |
| 2005/0246651 A1 | 11/2005 | Krzanowski | |
| 2005/0257138 A1 | 11/2005 | Chory et al. | |

(Continued)

FOREIGN PATENT DOCUMENTS

| | | |
|---|---|---|
| CN | 1610907 A | 4/2005 |
| JP | 06-124186 | 5/1994 |

(Continued)

OTHER PUBLICATIONS

Sclaroff, et al., "ImageRover: a Content-Based Image Browser for the World Wide Web", Jun. 20, 1997, IEEE, 2006, pp. 1.

(Continued)

*Primary Examiner* — Jordany Nunez
(74) *Attorney, Agent, or Firm* — Hope Baldauff, LLC

(57) ABSTRACT

Technologies are described herein for presenting and navigating content having varying properties. One or more local or networked providers are searched for content objects. Content objects include associated metadata and may be stored within a content container. Each content object is displayed separately from its associated content container. Displayed content objects may be grouped and filtered based upon the associated metadata. Displayed content objects may also be grouped and filtered based upon the provider from which they were retrieved. Selection of a content object causes the content container associated with the selected content object to be displayed. Alternately, selection of a content object may cause a preview of the selected content object and the metadata associated with the selected content object to be displayed.

12 Claims, 7 Drawing Sheets

(56) References Cited

U.S. PATENT DOCUMENTS

| | | | |
|---|---|---|---|
| 2006/0053382 A1* | 3/2006 | Gardner et al. | 715/764 |
| 2006/0059440 A1 | 3/2006 | Pry | |
| 2006/0156246 A1 | 7/2006 | Williams et al. | |
| 2006/0184901 A1 | 8/2006 | Dietz | |
| 2006/0282789 A1* | 12/2006 | Kim | 715/764 |
| 2007/0005576 A1* | 1/2007 | Cutrell et al. | 707/3 |
| 2007/0016575 A1* | 1/2007 | Hurst-Hiller et al. | 707/5 |
| 2007/0073777 A1 | 3/2007 | Werwath et al. | |
| 2007/0130112 A1 | 6/2007 | Lin | |
| 2008/0140712 A1* | 6/2008 | Weber et al. | 707/104.1 |
| 2008/0270378 A1* | 10/2008 | Setlur et al. | 707/5 |
| 2011/0231431 A1* | 9/2011 | Kamiwada et al. | 707/769 |
| 2012/0023133 A1* | 1/2012 | Yeon | 707/770 |

FOREIGN PATENT DOCUMENTS

| | | | |
|---|---|---|---|
| JP | 2000-276486 A | 10/2000 | |
| JP | 2001-273314 A | 10/2001 | |
| JP | 2001-297022 A | 10/2001 | |
| JP | 2001-350766 A | 12/2001 | |
| JP | 2002-197113 A | 7/2002 | |
| JP | 2003-233800 A | 8/2003 | |
| JP | 2004-240692 A | 8/2004 | |
| JP | 2005-71227 A | 3/2005 | |
| JP | 2005-531074 A | 10/2005 | |
| JP | 2006-514377 A | 4/2006 | |
| JP | 2009-512067 A | 3/2009 | |
| KR | 1020030070480 A | 8/2003 | |
| KR | 1020060095629 A | 9/2006 | |
| WO | WO 2004/036460 A2 | 4/2004 | |
| WO | WO2006077512 A1 | 7/2006 | |
| WO | WO2007006075 A1 | 1/2007 | |
| WO | WO 2007/044313 | 4/2007 | |

OTHER PUBLICATIONS

Kampfe, et al., "INDI—Intelligent Database Navigation by Interactive and Intuitive Content-Based Image Retrieval" Jun. 24-28, 2002, vol. 3, IEEE, 2006, pp. 1.

Bird, et al., "Content-Driven Navigation of Large Databases", May 22, 1996, IEEE, 2006, pp. 1.

"International Search Report", Mailed Date: May 18, 2011, Application No. PCT/US2008/065459, Filed Date: May 31, 2008, pp. 8. (MS# 320241.02).

Chinese Official Action dated Aug. 3, 2012 in Chinese Application No. 200880020069.3.

European Search Report dated Oct. 16, 2012 in European Application No. 08769951.8.

Japanese Official Action dated Nov. 16, 2012 in Japanese Application No. 2010-512260.

Chinese Official Action dated Apr. 27, 2013 in Chinese Application No. 200880020069.3.

* cited by examiner

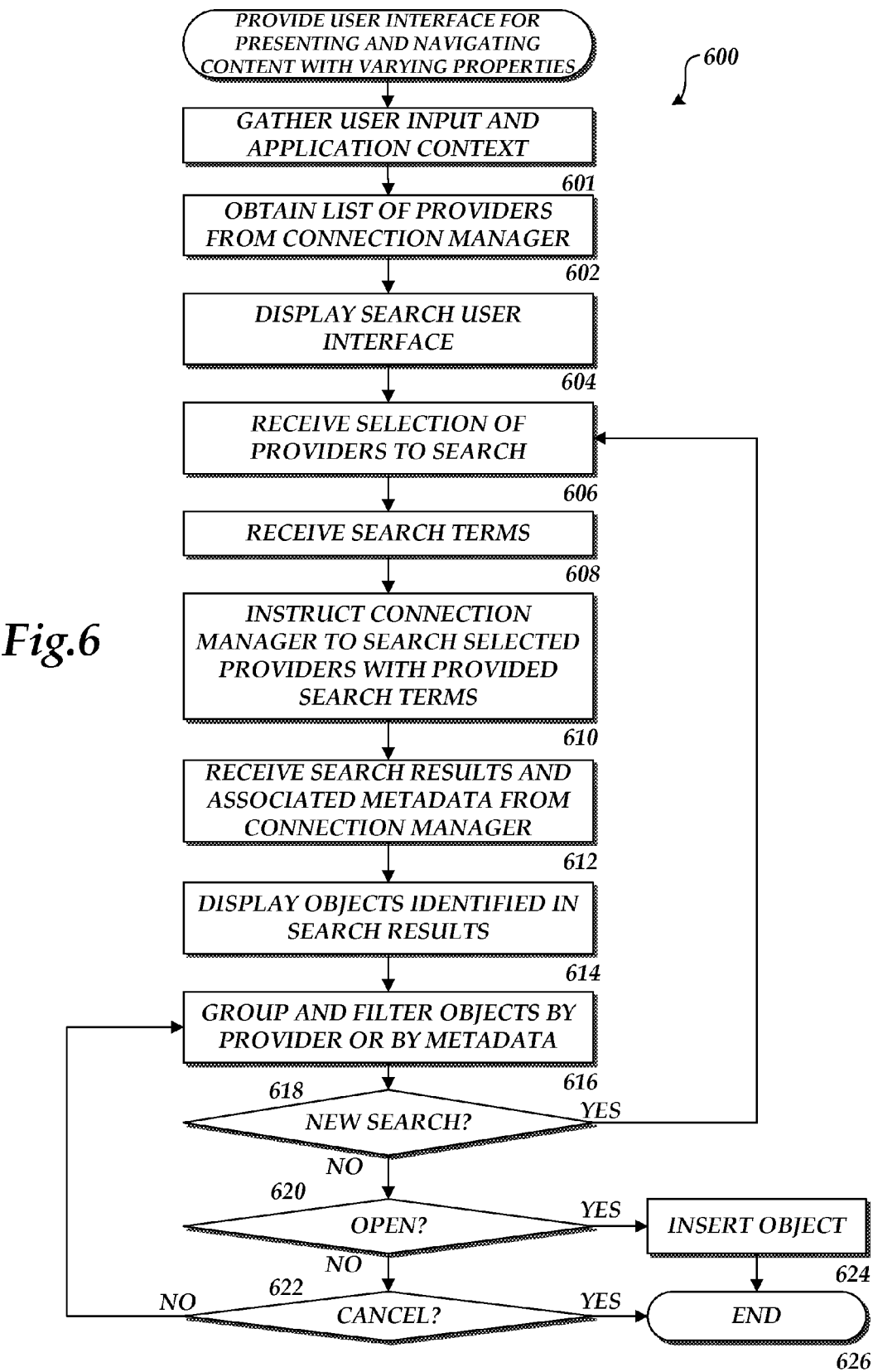

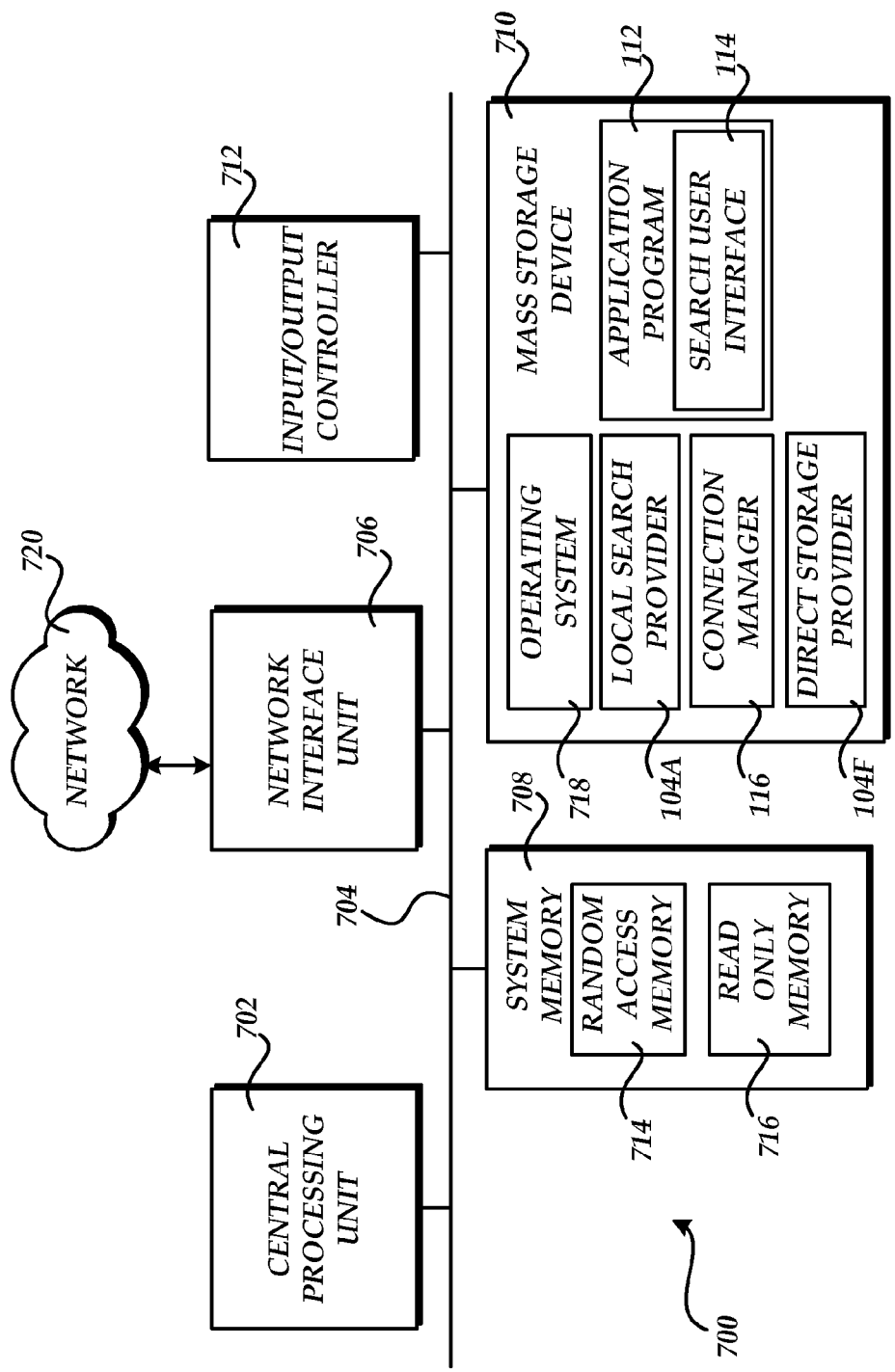

PRESENTING AND NAVIGATING CONTENT HAVING VARYING PROPERTIES

BACKGROUND

Today's computer users have access to an incredible amount of digital content, such as images, videos, and audio files. Such content, however, may be stored in disparate locations across a user's local computer, across a local area network ("LAN"), or across a wide area network ("WAN") such as the Internet. As a result, the user experience for locating such content has in the past been scattered and inconsistent. In order to search for a desired image across all available sources, for instance, users have previously been forced to utilize multiple application programs, each with its own unique user interface.

Another complication in locating desirable content arises from the fact that content is frequently stored within documents or other types of content containers. For instance, images are often stored within word processing documents, charts are often stored within spreadsheet documents, content of all kinds is stored as attachments to electronic mail ("e-mail") messages, and images and videos are stored with world wide web ("Web") pages. As a result, it can be difficult to locate content that is stored within such containers.

Previous user interfaces for searching for content typically present search results in the context of the container in which they are stored, and require a user to locate and manually save the desired content. For instance, if a Web page includes an image matching a search query, the image will be presented in the context of the Web page with which it is associated. A user must then manually locate the desired image on the Web page, save the image, and then possibly perform a desired function with the saved image, such as inserting the image into a document. This process can be complicated and time consuming for the user.

It may also be difficult to group and filter search results because some of the located content may have associated metadata that identifies unique properties of the content, while other content does not. As a result, previous user interfaces for searching for content only permit grouping and filtering based upon the properties that are common to all content, such as filename, size, and creation date. Functionality is not provided for grouping or filtering search results based on metadata that is unique to a particular kind of content or based upon the provider from which the content was obtained.

It is with respect to these considerations and others that the disclosure made herein is presented.

SUMMARY

Technologies are described herein for presenting and navigating content having varying properties. Through the utilization of the technologies and concepts presented herein, a user can quickly and easily locate content available from local and network providers. Moreover, content can be viewed, filtered, and grouped outside of the context of the content container within which it is stored. Content can also be easily grouped and filtered based upon properties that are unique to the type of content or to the search provider from which the content was retrieved.

According to one aspect presented herein, a user interface is provided for searching, presenting, and navigating content objects. Content objects may comprise any type of digital content, such as images, video, clip art, animations, charts, themes, text, layouts, and others. Content objects may be stored inside of content containers. A content container is a data construct for holding one or more content objects. For instance, a word processing document is a type of content container that may be utilized to store text, formatting, images, clip art, and other types of content objects. Content containers may also hold other content containers. For instance, an e-mail message may have a document or other type of content container attached thereto.

In one implementation, the user interface presented herein includes a user interface control through which a user can select one or more providers from which content objects should be retrieved. The providers may be search providers or direct storage providers. Search providers may be local or networked and provide functionality for storing, indexing, and searching content. Direct storage providers provide functionality for accessing local content such as images or documents stored on a local hard disk directly without first accessing a search index. A user can also provide search terms for use by the search providers in identifying content objects. The search terms are transmitted to each of the search providers along with a request to search for content objects matching the search terms.

Each search provider will return content objects that match the provided search terms. The direct storage provider will return content objects stored on storage devices in one or more specified locations, such as local hard drives, removable mass storage devices, networked drives, and other types of local storage devices, without consulting a search index. The providers may also return metadata for each of the returned content objects that includes properties for each content object. The metadata may be specific to a particular type of content object or to the provider from which the content object was returned. For instance, an image may include metadata that identifies the price, duration, and other terms of a license for the image. The metadata may also identify the provider from which the content object was returned.

According to other aspects, each content object returned from a provider is displayed separately from its associated content container. In this manner, a user can interact with each content object outside of the context of the content container within which it is stored. For instance, the displayed content objects may be grouped or filtered based upon the associated metadata. The displayed content objects may also be grouped or filtered based upon the provider from which they were retrieved.

According to other aspects, the content objects may be selected individually. In response to such a selection, the content container associated with the selected content object may be displayed. For instance, if the content object is an image that is attached to an e-mail message, selection of the image will result in the display of the e-mail message. In this manner, a user can interact with the content objects apart from the associated content container while retaining the ability to view the contents of the content container. In another implementation, selection of the content object will cause a preview of the content object to be displayed along with at least a portion of the metadata associated with the selected content object.

It should be appreciated that the implementations described herein are applicable to any type of computer program that provides for the search and retrieval of content. For example, the concepts presented herein may be utilized in word processing application programs, spreadsheet application programs, presentation application programs, desktop publishing application programs, and other types of application programs. An operating system program may also utilize the concepts presented herein. The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a flow diagram showing an illustrative process for presenting and navigating content having varying properties in one implementation described herein; and FIG. 7 is a computer architecture diagram showing an illustrative computer hardware and software architecture for a computing system capable of implementing the embodiments presented herein.

DETAILED DESCRIPTION

Figure 1:
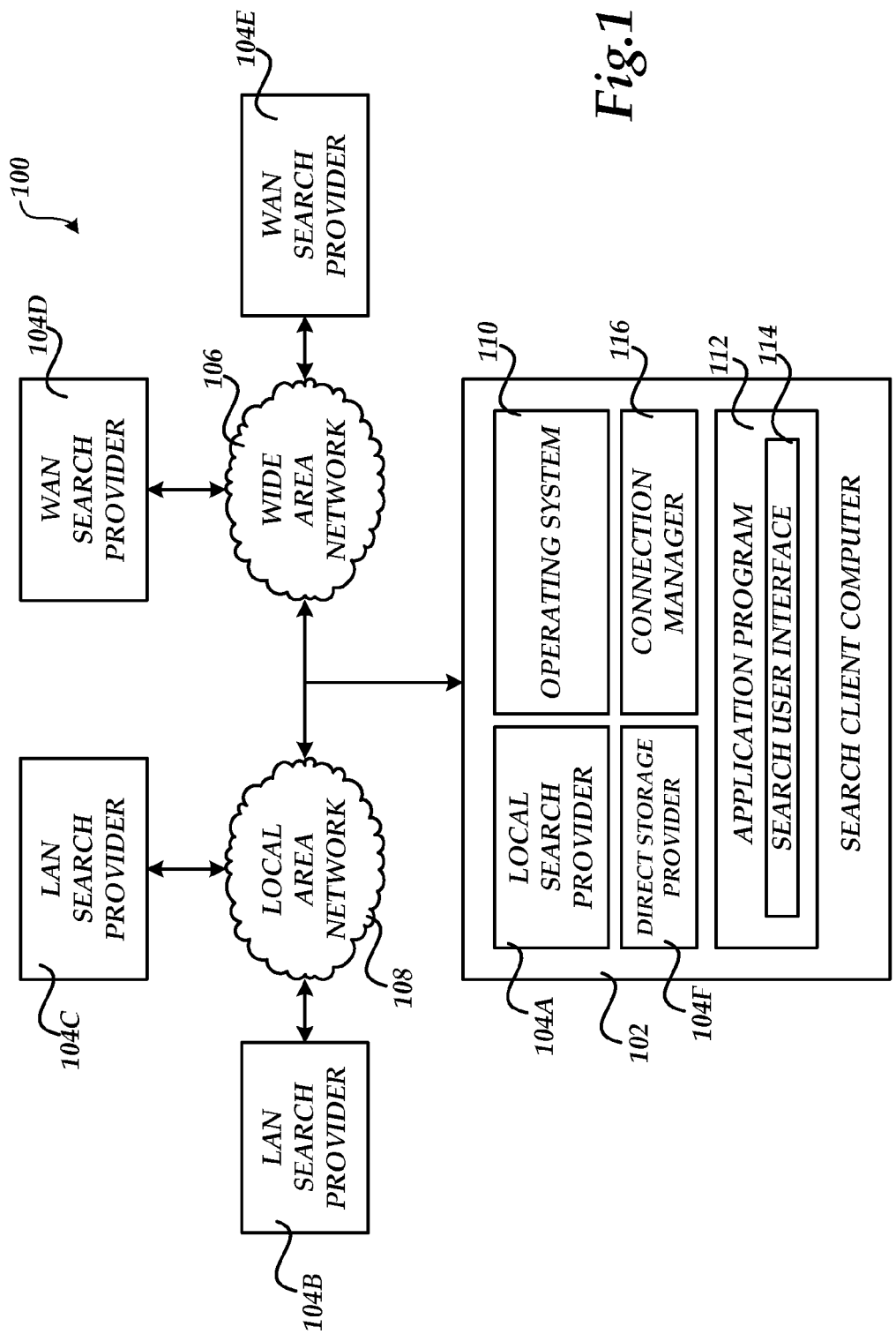
FIG. 1 is a network diagram showing aspects of an illustrative operating environment in conjunction with aspects of a search client computer embodying aspects of the several embodiments presented herein.

The following detailed description is directed to technologies for locating, presenting, and navigating content having varying properties. Through the use of the embodiments presented herein, a user can easily locate content stored at local and networked locations, and interact with located content without reference to a container object within which the content is stored. In this manner, a user can more easily make use of located content than permitted by previous solutions for locating content.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for presenting and navigating content having varying properties will be described.

Figure 3:
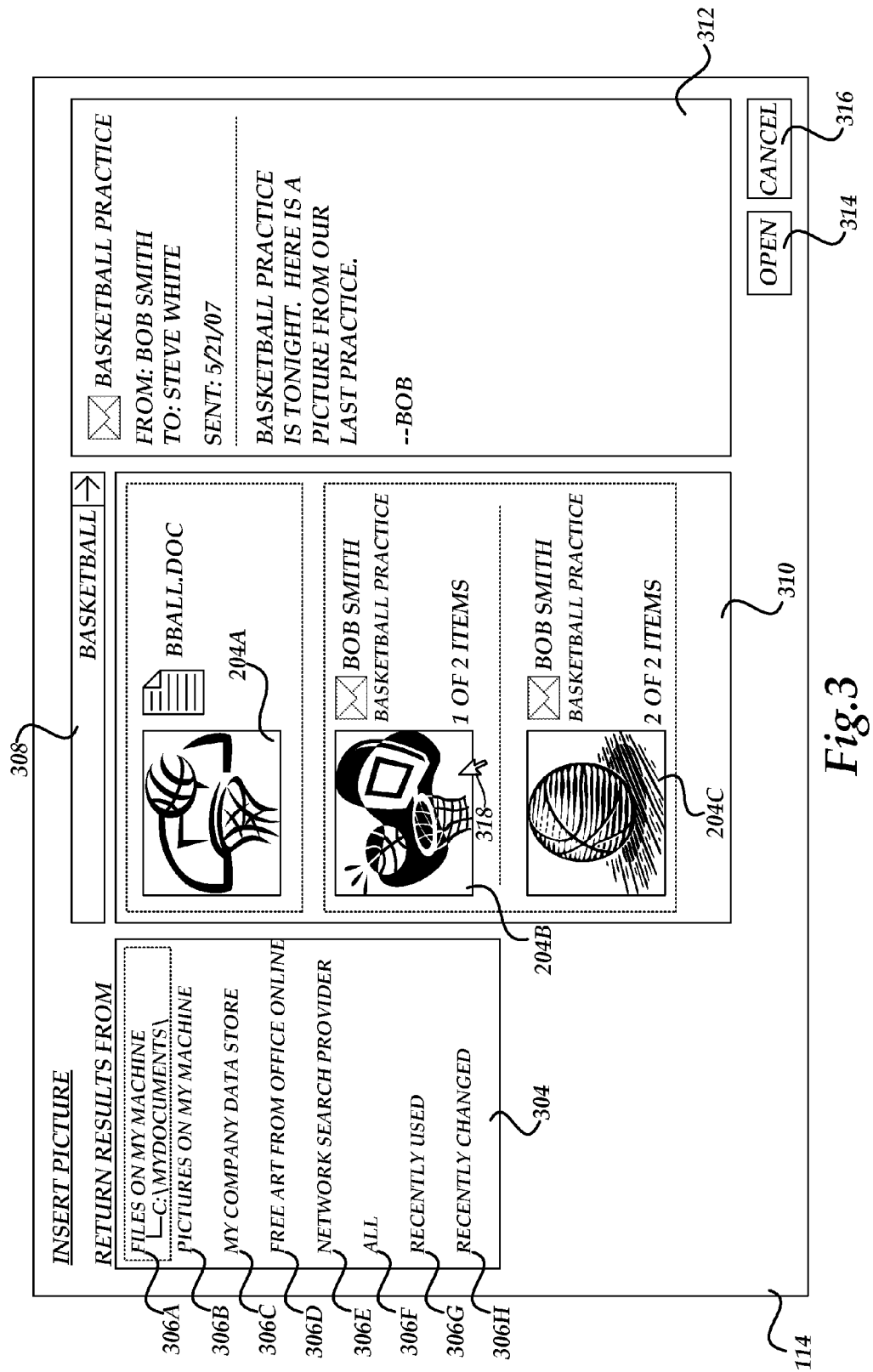
FIGS. 3-5 are screen diagrams showing aspects of a user interface provided by an application program for presenting and navigating content having varying properties in one embodiment presented herein.
Figure 4:
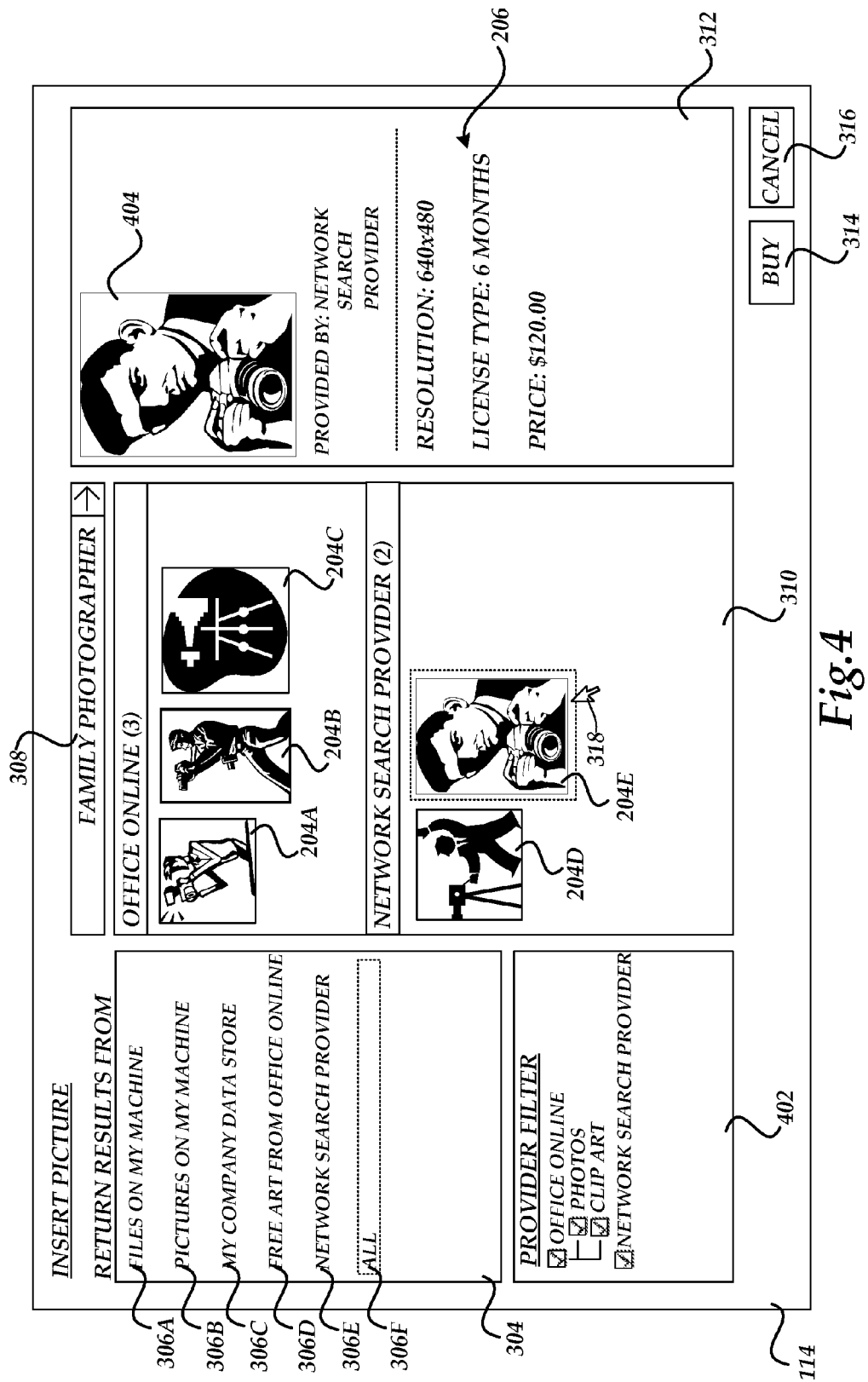
Figure 5:
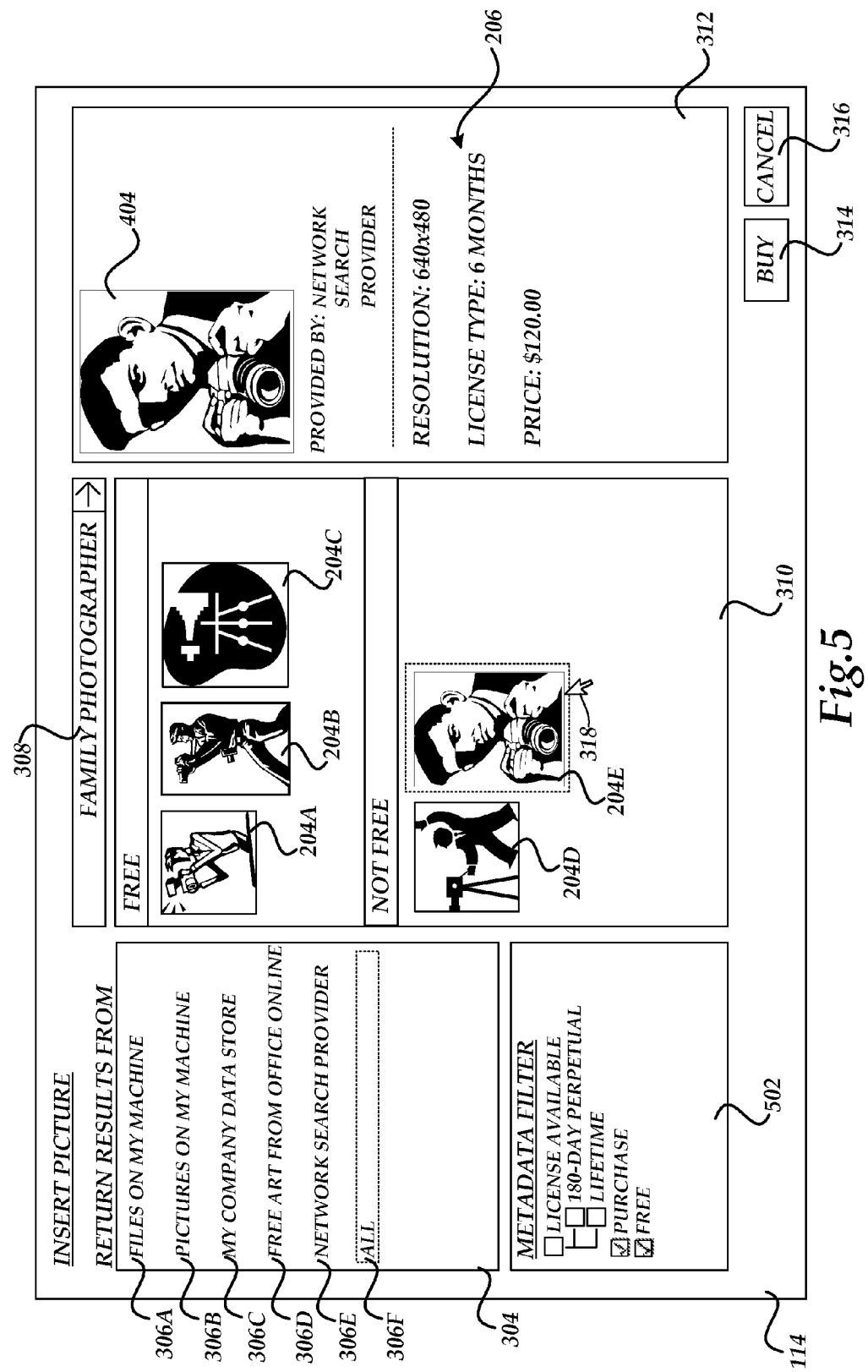

Turning now to FIG. 1, details will be provided regarding an illustrative operating environment for the implementations presented herein, as well as aspects of several software components that provide the functionality described herein for displaying and navigating content. In particular, FIG. 1 is a network architecture diagram showing aspects of a search client computer 102, a local search provider 104A, a direct storage provider 104F, and several network search providers 104B-104E. As will be described in greater detail below, the search client computer 102 is operative to execute an operating system 110 and an application program 112 that provides a search user interface 114. The application program 112 may comprise any type of program capable of searching for and utilizing digital content. For instance, in one implementation, the application program 112 comprises a word processing application program that includes functionality for searching for images, navigating located images, and inserting located images into word processing documents. The search user interface 114, which is described in greater detail below with reference to FIGS. 3-5, provides a user interface for accessing this functionality.

In order to provide the functionality described herein, the application program 112 operates in conjunction with a connection manager 116. The connection manager 116 is a program module that provides functionality for communicating with one or more providers 104A-104F. The search providers 104A-104E provide functionality for storing content, indexing the content, and searching the content in response to requests from the connection manger 116. The direct storage provider 104F returns content objects stored on local storage devices in one or more specified locations. This type of content is accessed directly without the use of a search index.

The search providers 104A-104E may comprise local search providers, such as the search provider 104A. A local search provider is a program module executing on the search client computer 102 that is capable of indexing and searching content stored at the search client computer 102. As used herein, the term content refers to any type of digital information and includes, but is not limited to, images, videos, documents, text, e-mail messages, forms, charts, clip art, animations, effects, layouts, icons, and themes.

The search providers 104A-104E may also comprise LAN search providers 104B-104C. LAN search providers are search providers operative to index and search content stored on a local area network to which the search client computer 102 is connected, such as the LAN 108. A company's intranet, internal collaboration Web sites, and e-mail servers are examples of such LAN search providers. Other types of LAN search providers may also be utilized.

The search providers 104A-104E may also take the form of WAN search providers 104D-104E. WAN search providers are search providers that are accessible through a wide area network, such as the Internet. WAN search providers may take the form of public Internet search engines, commercial content providers, and virtually any other type of searchable database made available over the Internet. The connection manager 116 may cause a search to be performed by the local search provider 104A, the LAN search providers 104B-104C, and the WAN search providers 104D-104E simultaneously. Search results received from the various providers may be relayed to the application program 112 in an asynchronous manner as they are received. The connection manager 116 may also communicate with the direct storage provider 104F to allow browsing of non-indexed, locally-stored content through the search user interface 114. It should be appreciated that multiple connection managers may be utilized, each of which may be customized for a particular purpose such as communicating with local or network providers.

As will be described in greater detail below, the search user interface 114 provides functionality for allowing a user to select which of the search providers 104A-104E should be searched for content. The user can also provide search terms that should be utilized by the search providers 104A-104E when searching their respective content databases. When such a search is initiated through the search user interface 114, the application program 112 communicates with the connection manager 116 to request the search. In turn, the connection manager 116 relays the search request, including the search terms, to the desired search providers 104A-104E.

The connection manager 116 also receives search results generated by the queried search providers and relays the search results to the application program 112. The results are displayed by the search user interface 114 and a user is permitted to navigate the results in the manner described below. It should be appreciated that the connection manager 116 abstracts the details of the communication with the providers 104A-104F from the application program 112. In this regard, the connection manager 116 may expose an application programming interface ("API") for use by the application program 112 in initiating searches and receiving search results. The API may provide functionality for discovering the available providers 104A-104F, querying the providers 104A-104F, and for receiving the results. Other application programs and the operating system 110 may utilize the API provided by the connection manager 116 in a similar manner.

Figure 2:
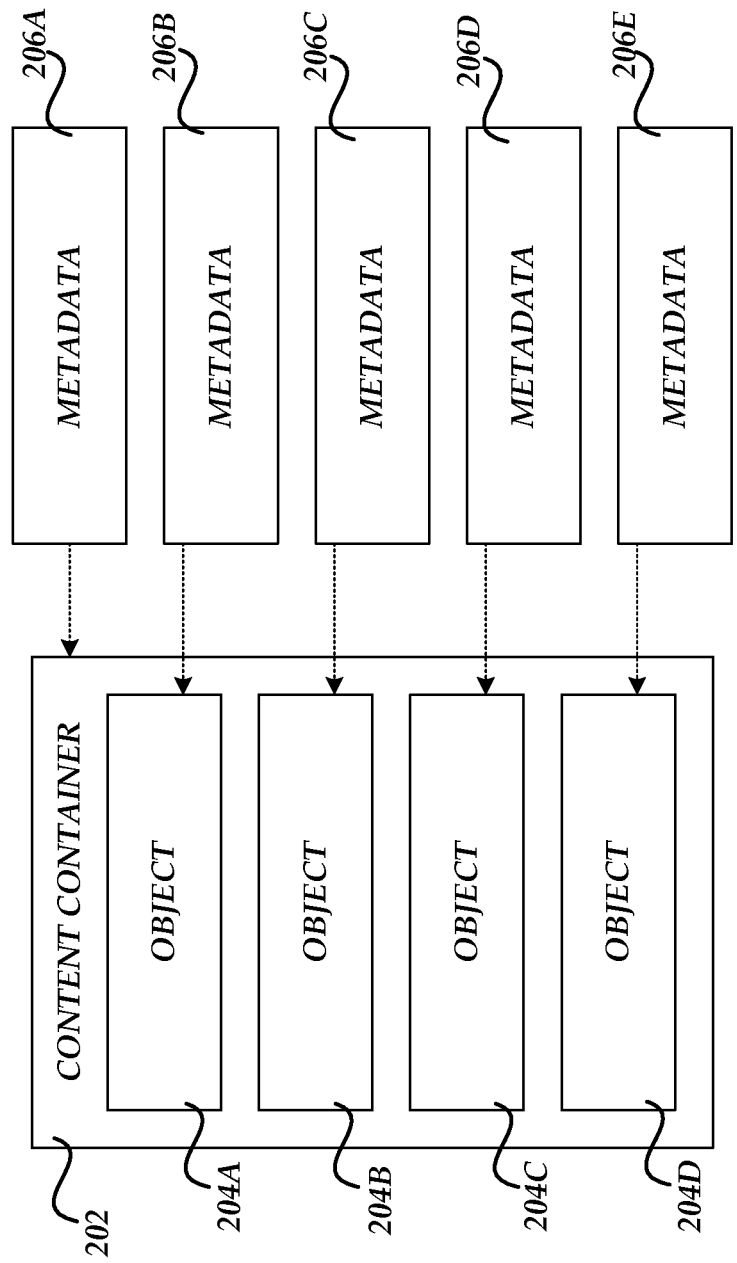
FIG. 2 is a data structure diagram showing aspects of a content container and content objects stored therein utilized in one embodiment presented herein.

Referring now to FIG. 2, additional details regarding the digital content that is made available by the providers 104A-104F will be described. In particular, the content available from the providers 104A-104F may be stored as content objects. Content objects are units of digital content. For instance, content objects may include, but are not limited to, text, images, videos, clip art, animations, effects, themes, layouts, charts, and icons. In order to facilitate searching for content objects, metadata may be maintained that describes various properties of each content object. For instance, a digital photograph may have associated metadata that describes the subject of the image, the creator of the image, the type of camera that the image was taken with, and other information.

As shown in FIG. 2, the content objects available from the various providers 104A-104F may also be stored within a content container 202. A content container 202 is a data construct for holding one or more content objects 204A-204D or content containers. For instance, a word processing document is a type of content container that may be utilized to store text, formatting, images, clip art, and other types of content objects. A spreadsheet document is another type of content container that may be utilized to store numbers, formulas, charts, and other types of content objects. A Web page is another type of content container that stores text, formatting, images, videos, and other types of content objects. An e-mail message is another type of content container that is utilized to store content objects as attachments to the e-mail message itself or other content containers. It should be appreciated that other types of content containers may be utilized with the implementations presented herein.

As also shown in FIG. 2, the providers 104A-104F may maintain metadata 206A for the content container 202. Metadata 206B-206E may also be maintained for each of the content objects 204A-204D, respectively, within a content container 202. The metadata 206A-206E is generally utilized by a search provider when searching for content. When search terms match the contents of the metadata for a content container 202 or a content object 204, the matching container 202 or content object 204 and its associated metadata may be returned to the connection manager 116.

According to aspects, the metadata 206 may be specific to a particular type of content object or to a particular search provider 104A-104E. For instance, if the content object 204B is a digital rights restricted image, the metadata 206C associated with the content object 204B may include properties identifying the licensing terms for the image. This metadata would not be present for a non-restricted image. In this regard, it should be appreciated that the metadata defined for each of the content objects in a content container 202 may include different properties. As will be described in greater detail below, the search user interface 114 provides functionality for filtering and grouping search results utilizing these content object type-specific properties.

According to embodiments, when search terms match a content object, a search provider may return only the content object and its metadata. The search provider may also return information identifying the content container 202 in which the matching content object is stored. Alternatively, when search terms match a content object, a search provider may return only data describing the content container 202. An additional search of the content container 202 may need to be performed to identify the matching content object.

As will be described in greater detail below with respect to FIGS. 3-6, the search user interface 114 provides functionality for causing a search to be performed by the providers 104A-104F and for exposing matching content objects separately from the content containers 202 in which they are stored. The search user interface 114 also provides functionality for filtering and grouping the returned content containers 202 based upon the contents of the metadata 206 associated with each content object. This functionality will be described in greater detail below.

Referring now to FIG. 3, an illustrative search user interface 114 provided by the application 112 in one embodiment for presenting and navigating content having varying properties will be described. In the implementation shown in FIG. 3, the search user interface 114 provides functionality for locating an image to be inserted into a document. It should be appreciated, however, that a similar user interface might be utilized for locating other types of content objects and for performing other actions with the located content objects.

It should also be appreciated that, according to embodiments, the functionality provided by the search user interface 114 may be customized based upon the current context of the application program 112 when the search user interface 114 is instantiated. For instance, if a user requests to insert an image into a document, the search user interface 114 shown in FIG. 3 may be displayed. If, however, a user requests to insert a chart into a document, the search user interface 114 may be customized for locating charts. This customization may include, for instance, identifying search providers from which charts are available. The operation of the search user interface 114 may also be customized based upon the entry point the user has chosen (e.g. insert background as opposed to insert picture), the application 114 itself (e.g. the search user interface 114 may provide different default functionality when the application 114 is an e-mail client or a word processing application), or the context surrounding the current insertion point ("IP") in the application 114 (e.g. the text or other content near the IP). Other document properties, metadata, and state may be similarly utilized to customize the operation of the search user interface 114. For instance, in one implementation, the word or words near the IP or in other portions of the document may be utilized as search terms for the search. In this way, both the search itself and the operation of the search user interface 114 may be customized utilizing the current context of the application program 112.

As shown in FIG. 3, the search user interface 114 presented in one embodiment includes a user interface pane 304 through which a user may select the search providers 104A-104E that should be searched for the desired content objects. In the implementation shown in FIG. 3, a list including selectable elements 306A-306F corresponding to the available search providers 104A-104E is displayed in the user interface pane 304. The element 306A corresponds to the direct storage provider 104F, the element 306B corresponds to the local search provider 104A, the element 306C corresponds to a LAN search provider 104B, and the elements 306D-306E correspond to WAN search providers 104D-104E. The element 306F allows a user to specify that all of the available search providers should be searched. The elements 306G and 306H allow a user to specify that recently used or changed objects, respectively, should be included in the search. In the example shown in FIG. 3, the element 306A has been selected. It should be appreciated that other types of user interface controls may be presented that permit a user to select the providers 104A-104F that should be searched.

According to embodiments, the user interface pane 304 may also be customized based upon the current context of the application 112. For instance, if the application 112 is a word processing application and a word processing document is currently open, the user interface pane 304 may include elements through which a user may request that a search be performed using key terms in the current document or for similar images or other types of objects in the current document.

The search user interface 114 also includes a search box 308 for receiving the keywords or search terms that should be utilized by the search providers when searching for content objects. In the example shown in FIG. 3, a user has provided the search term "basketball." In response to receiving the search term and a request to search, the application program 112 operates in conjunction with the connection manager 116 to cause a search to be performed of the content maintained by the search providers 104A-104E. If matching content is located, the content is returned to the connection manager 116 and, in turn, the application program 112 in the manner described above. The returned content is then displayed by the search user interface 114.

In the example shown in FIG. 3, a search utilizing the term "basketball" has returned three content objects 204A-204C. These content objects are presented by the search user interface 114 in the user interface pane 310. In this example, the returned content object 204A is stored in a word processing document named "BBALL.DOC" and the objects 204B-204C are stored as attachments to an e-mail message. As such, it is not necessary for a user to interact with the document or e-mail message in order to access the returned content objects 204A-204C.

In one implementation, data from the appropriate content container may be displayed along with the returned content objects in order to provide some context to the user regarding where the content objects are located. For instance, in FIG. 3, an indication has been presented along with the content objects 204A that it is stored in a word processing document and along with the content objects 204B-204C that the matching objects are stored in an e-mail message. The name of the word processing document in which the content object 204A is stored has been displayed. The name of the sender and subject of the e-mail message has also been presented for each returned content object stored in an e-mail message. An indication has also been provided regarding how many attachments to each e-mail message are available. This information is provided in order to convey information about the content container for each content object and does not require the user to interact with the content container in order to access the content object.

According to other aspects, a user may select one of the returned content objects 204A-204C, such as with a mouse cursor 318, or with another type of user input device. For instance, in FIG. 3, a user has selected the content object 204B. In response to such a selection, data associated with the content container 202 for the selected content object 204A is displayed in the user interface pane 312. In particular, in the example shown in FIG. 3, the body text of the e-mail message to which the content object 204B is attached is shown in the user interface pane 312. In this manner, additional context can be provided to a user regarding each of the returned content objects 204A-204C. In other embodiments presented herein, a preview of the selected content object 204B may be shown in the user interface pane 312. Additionally, as will be described in greater detail below with respect to FIGS. 4-5, the metadata provided with each of the returned content objects may be utilized to filter and group the display of the content objects presented in the user interface pane 310.

An appropriate user input will cause the selected content object 204B to be inserted into the currently active document. For instance, in the illustrative user interface shown in FIG. 3, selection of the user interface button 314 will cause the selected content object 204B to be inserted into the currently active document. The insertion will be performed seamlessly without any other action required of the user. Selection of the user interface button 316 will cancel the insert operation and remove the display of the search user interface 114.

Referring now to FIG. 4, other details regarding various aspects of the search user interface 114 provided herein will be described. In the implementation shown in FIG. 4, a user interface pane 402 has been displayed within the search user interface 114 for allowing a user to filter the search results based upon the search provider from which the search results were obtained. In particular, the user interface pane 402 includes user interface check boxes corresponding to the search providers 104A-104E from which the content objects shown in the user interface pane 310 were returned. In the example shown in FIG. 4, a search has been made for the term "family photographer" and the content objects 204A-204C have been returned and displayed in the user interface pane 310.

Through the selection of the check boxes in the user interface pane 402, a user can identify the search providers from which returned content objects should be displayed. Selection of a check box will cause search results returned from the corresponding search provider to be displayed in the user interface pane 310. De-selection of a check box will cause search results returned from the corresponding search provider to not be displayed in the user interface pane 310. In this manner, the search user interface 114 allows search results to be filtered according to the search provider from which they were received. It should be appreciated that although check boxes have been illustrated in FIG. 4, any suitable user input control may be utilized to permit the filtering of search results.

According to embodiments, the search user interface 114 also provides functionality for grouping search results according to the search provider from which they were received. For instance, in the example shown in FIG. 4, the content objects 204A-204C were received from one search provider and are grouped together in the user interface pane 310. The content objects 204D-204E were received from another search provider and are also grouped together.

In the implementation shown in FIG. 4, the selection of one of the content objects 204A-204E, such as with the mouse cursor 318 or other suitable user input mechanism, will cause a preview of the selected content object to be displayed in the user interface pane 312. For instance, in the example shown in FIG. 4, the content object 204E has been selected. As a result, the preview 404 is displayed in the user interface pane 312. Additionally, metadata 206 associated with the selected content object 204E has also been displayed in the user interface pane 312. For instance, in the example shown in FIG. 4, the resolution, license type, and price for the content object 204E has been displayed. Other information may also be displayed in a similar fashion.

Turning now to FIG. 5, details regarding additional aspects of the search user interface 114 provided herein will be described. In the implementation shown in FIG. 5, a user interface pane 502 has been provided by the search user interface 114. The user interface pane 502 includes a user interface control for filtering the search results shown in the user interface pane 310 based on the metadata associated with the search results. For instance, in the example shown in FIG. 5, check boxes are utilized that correspond to metadata returned from the search providers with the content objects 204A-204E. Selection of a check box will cause content objects having the corresponding metadata to be displayed within the user interface pane 310. De-selection of a check box will cause content objects not having the corresponding metadata to not be displayed.

In the example shown in FIG. 5, a user has selected check boxes corresponding to metadata for free images and images that are available for purchase. As a result, content objects 204A-204E having matching metadata are displayed in the user interface pane 310. Any returned content objects that are not free or for purchase are not displayed within the user interface pane 310.

According to embodiments, the search user interface 114 also provides functionality for grouping search results based on the metadata associated with the search results. For instance, in the example shown in FIG. 5, the content objects 204A-204C have associated metadata indicating that they are free. Accordingly, these objects are grouped together in the user interface pane 310. The content objects 204D-204E include metadata indicating that they are not free. As a result, these content objects are also grouped together. An appropriate user interface mechanism may be utilized to select the metadata utilized for grouping the search results. It should be appreciated that although check boxes have been illustrated in FIG. 5, any suitable user input control may be utilized to permit the filtering of search results based on the metadata associated with the search results.

Turning now to FIG. 6, additional details will be provided regarding the embodiments presented herein for presenting and navigating content having varying properties. In particular, FIG. 6 is a flow diagram showing a routine 600 that shows aspects of an illustrative process performed by the application program 112 for providing a user interface for locating, presenting, and navigating content objects. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 601, where the search user interface 114 receives user input, such as search terms, and gathers the current context of the application program 112. As discussed above, the current context of the application program 112 may be utilized to customize the operation of the search user interface 114. From operation 601, the routine 600 continues to operation 602 where the application program 112 obtains a list of the available search providers 104A-104E from the connection manager 116. As discussed above, the connection manager 116 may expose an API for this purpose. Once the application program 112 has obtained the list of available search providers, the routine 600 proceeds to operation 604. At operation 604, the application program 112 displays the search user interface 114, including the available search providers. The routine 600 then proceeds to operation 606, where a selection is received from a user regarding the search providers that should be queried for content objects. The routine 600 then proceeds to operation 608.

At operation 608, the search user interface 114 receives the search terms that should be utilized to query the identified search providers 104A-104E. Once the search terms have been received and the user has requested that the search be performed, the routine 600 proceeds to operation 610 where the connection manager 116 is instructed to search the selected search providers with the provided search terms. In response thereto, the connection manager 116 communicates with the selected search providers to cause the requested search to be performed.

At operation 612, the application program 112 receives the search results and associated metadata from the connection manager 116. Once the results have been returned, the routine 600 continues to operation 614, where the content objects returned from the search providers are displayed in the manner described above with respect to FIGS. 3-5. The routine 600 then continues to operation 618, where a determination is made as to whether a user has requested a new search, such as by the provision of new search terms. If a new search has been requested, the routine 600 proceeds from operation 618 to operation 606, described above.

If a new search has not been requested, the routine 600 continues from operation 618 to operation 620. At operation 620, a determination is made as to whether a user has indicated that a selected content object should be inserted into the current document, such as through the selection of the user interface button 314. If so, the routine 600 proceeds to operation 624, where the selected content object is inserted into the current document. If not, the routine 600 proceeds to operation 622.

At operation 622, a determination is made as to whether the user has cancelled the search and insert operation, such as through the selection of the user interface button 316. If not, the routine 600 returns to operation 616, described above. If so, the routine proceeds to operation 626, where it ends.

FIG. 7 shows an illustrative computer architecture for a computer 700 capable of executing the software components described herein for presenting and navigating content having varying properties. The computer architecture shown in FIG. 7 illustrates a conventional desktop, laptop computer, or server computer and may be utilized to execute any aspects of the application program 112 described herein.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 720. The computer 700 may connect to the network 720 through a network interface unit 706 connected to the bus 704. It should be appreciated that the network interface unit 706 may also be utilized to connect to other types of networks and remote computer systems, such as those described above with respect to FIG. 1. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store an application program 112 and search user interface 114 that provides the functionality described herein for presenting and navigating content having varying properties. The mass storage device 710 and RAM 714 may also store an operating system 718, the local search provider 104A, the direct storage provider 104F, and the connection manager 116, each of which has been described above.

Based on the foregoing, it should be appreciated that technologies for presenting and navigating content having varying properties are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for presenting and navigating content objects having varying properties, the method comprising:
   displaying a user interface control for selecting one or more providers, wherein the one or more providers comprise one or more network search providers and one or more local search providers, the one or more local search providers comprising one or more program modules executing on a search client computer, the one or more program modules being configured to search for at least one of indexed, locally-stored content objects and non-indexed, locally-stored content objects;
   receiving a selection in the user interface control of the one or more providers by which the search for content objects should be made;
   causing a search for the content objects to be made by the selected one or more providers;
   receiving one or more content objects from the selected one or more providers in response to the search, the one or more content objects each having metadata associated therewith that matches one or more search terms of the search, wherein the metadata associated with each content object corresponds to a type of content object;
   displaying each content object separately from a first document within which the content object is contained;
   filtering the displayed content objects using the metadata;
   receiving a selection of one of the displayed content objects;
   displaying the first document within which the selected content object is contained,
   determining whether each displayed content object has been selected for insertion into a second document; and
   inserting each selected content object into the second document.

2. The method of claim 1, wherein the metadata associated with each content object corresponds to a type of content object, and wherein the method further comprises grouping and filtering the displayed content objects using the metadata.

3. The method of claim 2, further comprising:
   determining a current context for an application program, the current context comprising a selection of the selected content object for insertion into the second document and the type of content object of the selected content object; and
   customizing the search based on the current context.

4. The method of claim 1, further comprising:
   receiving a selection of one of the displayed content objects; and displaying a preview of the content object and the metadata associated with the content object.

5. An apparatus for presenting and navigating content objects having varying properties, the apparatus comprising:
a processor; and
a memory storing computer-executable instructions which, when executed by the processor, cause the apparatus to
display a user interface control for selecting one or more providers, wherein the one or more providers comprise one or more network search providers and one or more local search providers, the one or more local search providers comprising one or more program modules executing on a search client computer, the one or more program modules being configured to search for at least one of indexed, locally-stored content objects and non-indexed, locally-stored content objects,
receive a selection in the user interface control of the one or more providers by which the search for content objects should be made,
cause a search for the content objects to be made by the selected one or more providers,
receive one or more content objects from the selected one or more providers in response to the search, the one or more content objects each having metadata associated therewith that matches one or more search terms of the search, wherein the metadata associated with each content object corresponds to a type of content object,
display each content object separately from a first document within which the content object is contained,
filter the displayed content objects using the metadata,
receive a selection of one of the displayed content objects,
display the first document within which the selected content object is contained,
determine whether each displayed content object has been selected for insertion into a second document, and
insert each selected content object into the second document.

6. The apparatus of claim 5, wherein the metadata associated with each content object corresponds to a type of content object, and wherein the method further comprises grouping and filtering the displayed content objects using the metadata.

7. The apparatus of claim 6, wherein the memory has further computer-executable instructions stored thereupon which, when executed by the processor, cause the apparatus to:
determine a current context for an application program, the current context comprising a selection of the selected content object for insertion into the second document and the type of content object of the selected content object; and
customize the search based on the current context.

8. The apparatus of claim 5, wherein the memory has further computer-executable instructions stored thereupon which, when executed by the processor, cause the apparatus to:
receive a selection of one of the displayed content objects; and
display a preview of the content object and the metadata associated with the content object.

9. A non-transitory computer-readable storage medium having computer-executable instructions stored thereupon which, when executed by a computer, cause the computer to:
display a user interface control for selecting one or more providers, wherein the one or more providers comprise one or more network search providers and one or more local search providers, the one or more local search providers comprising one or more program modules executing on a search client computer, the one or more program modules being configured to search for at least one of indexed, locally-stored content objects and non-indexed, locally-stored content objects;
receive a selection in the user interface control of the one or more providers by which the search for content objects should be made;
cause a search for the content objects to be made by the selected one or more providers;
receive one or more content objects from the selected one or more providers in response to the search, the one or more content objects each having metadata associated therewith that matches one or more search terms of the search, wherein the metadata associated with each content object corresponds to a type of content object;
display each content object separately from a first document within which the content object is contained;
filter the displayed content objects using the metadata;
receive a selection of one of the displayed content objects;
display the first document within which the selected content object is contained;
determine whether each displayed content object has been selected for insertion into a second document; and
insert each selected content object into the second document.

10. The non-transitory computer-readable storage medium of claim 9, wherein the metadata associated with each content object corresponds to a type of content object, and wherein the method further comprises grouping and filtering the displayed content objects using the metadata.

11. The non-transitory computer-readable storage medium of claim 10, having further computer-executable instructions stored thereupon which, when executed, cause the computer to:
determine a current context for an application program, the current context comprising a selection of the selected content object for insertion into the second document and the type of content object of the selected content object; and
customize the search based on the current context.

12. The non-transitory computer-readable storage medium of claim 9, having further computer-executable instructions stored thereupon which, when executed, cause the computer to:
receive a selection of one of the displayed content objects; and
display a preview of the content object and the metadata associated with the content object.

* * * * *